(12) United States Patent
Rácz et al.

(10) Patent No.: US 11,075,997 B2
(45) Date of Patent: Jul. 27, 2021

(54) TECHNIQUE FOR RELIABLE COMMUNICATION IN A CLOUD ROBOTICS SYSTEM

(71) Applicant: Telefonaktiebolaget LM Ericsson (publ), Stockholm (SE)

(72) Inventors: Sándor Rácz, Cegléd (HU); Aldo Bolle, Västra Frölunda (SE); Geza Szabo, Kecskemet (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 91 days.

(21) Appl. No.: 16/617,665

(22) PCT Filed: Jul. 6, 2017

(86) PCT No.: PCT/EP2017/066995
§ 371 (c)(1),
(2) Date: Nov. 27, 2019

(87) PCT Pub. No.: WO2019/007517
PCT Pub. Date: Jan. 10, 2019

(65) Prior Publication Data
US 2020/0187286 A1  Jun. 11, 2020

(51) Int. Cl.
*B25J 9/16* (2006.01)
*B25J 13/00* (2006.01)
(Continued)

(52) U.S. Cl.
CPC .......... *H04L 67/125* (2013.01); *B25J 9/1689* (2013.01); *B25J 13/006* (2013.01);
(Continued)

(58) Field of Classification Search
CPC ......... A61B 34/30; A61B 34/32; A61B 34/35; B25J 9/16–161; B25J 9/1689;
(Continued)

(56) References Cited

U.S. PATENT DOCUMENTS

2017/0272972 A1* 9/2017 Egner ............... H04W 28/0268
2018/0292844 A1* 10/2018 Kosseifi .................. H04W 4/44

FOREIGN PATENT DOCUMENTS

EP    1898557 A1    3/2008
GB    2520641 A     5/2015

OTHER PUBLICATIONS

Coninck, Q. et al., "A First Analysis of Multipath TCP on Smartphones", International Conference on Passive and Active Network Measurement, Jan. 1, 2016, pp. 57-69, Springer.
(Continued)

*Primary Examiner* — Timothy J Weidner
(74) *Attorney, Agent, or Firm* — Coats & Bennett, PLLC

(57) ABSTRACT

A technique for providing reliable wireless communication between a robot (104) and a robot controller (102) in a cloud robotics system is disclosed. A method implementation of the technique is performed by a primary connectivity component (106) supporting multipath transmission over a plurality of wireless transmission paths to establish connectivity between the robot (104) and the robot controller (102). The method comprises triggering determining (S402) a robot sensitivity value indicating a degree of operation sensitivity of the robot (104) to a transmission failure between the robot (104) and the robot controller (102), and triggering configuring (S404) use of one or more of the plurality of wireless transmission paths for communication between the robot (104) and the robot controller (102) depending on the determined robot sensitivity value.

14 Claims, 4 Drawing Sheets

(51) Int. Cl.
*G05B 19/418* (2006.01)
*H04L 29/06* (2006.01)
*H04L 29/08* (2006.01)
*H04W 4/38* (2018.01)
*H04W 4/70* (2018.01)
*H04W 76/16* (2018.01)
*H04W 76/19* (2018.01)
*H04W 88/06* (2009.01)
*H04W 88/10* (2009.01)
*H04W 92/02* (2009.01)
*H04W 92/10* (2009.01)

(52) U.S. Cl.
CPC ..... *G05B 19/4185* (2013.01); *G05B 19/4186* (2013.01); *H04L 67/12* (2013.01); *H04L 69/14* (2013.01); *H04L 69/26* (2013.01); *H04W 4/38* (2018.02); *H04W 4/70* (2018.02); *H04W 76/16* (2018.02); *H04W 76/19* (2018.02); *G05B 2219/31162* (2013.01); *G05B 2219/31257* (2013.01); *G05B 2219/40174* (2013.01); *G05B 2219/50391* (2013.01); *H04W 88/06* (2013.01); *H04W 88/10* (2013.01); *H04W 92/02* (2013.01); *H04W 92/10* (2013.01)

(58) Field of Classification Search
CPC .... B25J 13/006; B64G 1/24; B64G 2001/247; B64G 4/00; B64G 2004/005; F41H 7/005; G05B 19/418; G05B 19/4185–4186; G05B 2219/31076; G05B 2219/31162; G05B 2219/31257; G05B 2219/40174; G05B 2219/45085; G05B 2219/50391; G05D 1/0276–0285; H04L 29/06; H04L 29/08; H04L 67/12–6125; H04L 69/14; H04L 69/26; H04W 4/30–48; H04W 4/70; H04W 40/005–38; H04W 48/02–06; H04W 76/10–19; H04W 84/005; H04W 88/06; H04W 88/10; H04W 92/02; H04W 92/04; H04W 92/10

See application file for complete search history.

(56) References Cited

OTHER PUBLICATIONS

Ali, M. et al., "QoS Aware Multipath Threshold Routing for Mobile Ad Hoc Networks", International Journal of Applied Information Systems (IJAIS), vol. 7 No. 1, Apr. 1, 2014, pp. 8-15, Foundation of Computer Sciences FCS.

Rao, A. et al., "Reliable Robotic Communication Using Multi-Path TCP", 2017 9th International Conference on Communication Systems and Networks (COMSNETS), Jan. 4, 2017, pp. 429-430, IEEE.

* cited by examiner

TECHNIQUE FOR RELIABLE COMMUNICATION IN A CLOUD ROBOTICS SYSTEM

TECHNICAL FIELD

The present disclosure generally relates to the field of cloud robotics. In particular, a technique for providing reliable wireless communication between a robot and a robot controller in a cloud robotics system is presented. The technique may be embodied in methods, computer programs, apparatuses and systems.

BACKGROUND

Cloud robotics is an emerging field of robotics which shifts robot control to the cloud in order to benefit from the powerful computational resources of cloud computing environments. A local cloud, for example, can provide low latency connections between robots and robot controllers enabling real-time collaboration among robots and the controllers in the cloud and the processing power provided by the cloud allows fast execution of heavy algorithms, such as video processing, or the like.

In order to provide reliable control, robot control from the cloud is subject to a number of connectivity requirements. Robot control algorithms are sensitive to control loop delays (higher delays in the control loop may result in control performance degradation, e.g., in precision, execution speed, etc.) and, therefore, real-time connectivity with strict latency requirements is generally required. For example, robot arm control typically requires less than 5-20 ms latency in case of velocity control. Moreover, closed loop robot control usually requires a constant bandwidth, on the one hand, for the robot to periodically send status information to the controller and, on the other hand, for the controller to send commands to the robot accordingly. In case of a UR5 robot arm (as manufactured by Danish robot manufacturer Universal Robots), for example, status messages have a default size of 1060 bytes and status messages are sent periodically with 125 Hz. Connection quality is thus highly critical for robot control and lost or delayed status messages or commands may result in uncontrolled movement of the robot and potentially cause serious damage.

In traditional industrial use cases, fixed robots (e.g., robot arms installed on fixed platforms) are connected to their robot controllers via fixed access, e.g., via wire based connections using common connectivity standards, such as Ethernet, or the like. For example, Profinet (Process Field Net) is a widely used industrial transmission protocol for data communication over Industrial Ethernet designed for collecting data and controlling equipment in industrial systems, with a particular strength in delivering data under tight time constraints in the range of 1 ms or less. In Profinet, three protocol levels are defined: (i) TCP/IP for non-time-critical data and the commissioning of a plant with reaction times in the range of 100 ms, (ii) Real-Time (RT) protocol for applications with cycle times down to 1 ms, and (iii) Isochronous Real-Time (IRT) for applications in drive systems with cycle times of less than 1 ms.

For mobile robots (e.g., robot arms installed on mobile platforms, autonomous ground robots with wheels transporting goods in a store house, drones, or self-driving vehicles), on the other hand, such fixed access is not feasible and, rather, wireless access is required. Since wireless communication is generally less reliable, different approaches have been proposed to improve the reliability of wireless connectivity. In Radio Access Networks (RANs), for example, improved reliability may be achieved using mechanisms like prioritization (e.g., using a dedicated bearer) and switching between base stations, frequencies and access technologies. A connectivity monitoring tool may detect connectivity problems and may take necessary actions, such as changing access or activating an active standby controller. Still, however, such solutions do not always provide the necessary reliability for robot control.

Also, while it is generally conceivable to employ multipath transmission over a plurality of wireless transmission paths (e.g., one path using a Long Term Evolution (LTE) interface and another path using a Wireless Local Area Network (WLAN) interface), existing multipath solutions are subject to various other drawbacks that make them unsuitable for cloud robotics systems. For example, if traffic is always duplicated and sent over multiple available transmission paths simultaneously, radio efficiency is decreased and cell capacity is reduced. Moreover, existing multipath solutions are typically not capable of achieving reliability in the time scale relevant for robot control (e.g., 5-20 ms for velocity control, as explained above). MultiPath TCP (MPTCP), for example, is capable of redirecting traffic from a degraded path to a more reliable path in a time frame of 1-10 seconds only.

SUMMARY

Accordingly, there is a need for a technique that provides reliable wireless communication between a robot and a robot controller in a cloud robotics system and that avoids one or more of the problems discussed above, or other problems.

According to a first aspect, a method for providing reliable wireless communication between a robot and a robot controller in a cloud robotics system is provided. The method is performed by a primary connectivity component supporting multipath transmission over a plurality of wireless transmission paths to establish connectivity between the robot and the robot controller. The method comprises triggering determining a robot sensitivity value indicating a degree of operation sensitivity of the robot to a transmission failure between the robot and the robot controller, and triggering configuring use of one or more of the plurality of wireless transmission paths for communication between the robot and the robot controller depending on the determined robot sensitivity value.

The robot controller may be executed in a cloud (i.e., more specifically in a cloud computing environment) and the robot may be a fixed or mobile robot (e.g., located in a plant or in an outdoor area) that wirelessly communicates with the robot controller to exchange messages required for control of the robot. For example, the robot may (e.g., periodically) send status messages to the robot controller, wherein a status message may contain information about the current physical state of the robot, such as joint positions, velocities, forces, currents, or the like. Status messages may enable the robot controller to decide on a next action to be performed by the robot and the controller may send a corresponding command to the robot to implement such action accordingly.

The robot and the robot controller may communicate using multipath transmission over a plurality of wireless transmission paths for reliability purposes. As known in the art, multipath transmission allows adaptive concurrent or interchangeable use of multiple paths (e.g., network links) to improve resource usage and increase redundancy for a network connection. For example, multipath transmission may enable simultaneous use of a plurality of transmission paths or enable switching from a currently used transmission path to an alternative transmission path that provides better reliability or bandwidth. Concurrently or interchangeably usable network interfaces associated with these transmission paths may include a mobile communication network interface, such as an LTE or 5G interface, and a WLAN interface, for example.

To establish connectivity between the robot and the robot controller using multipath transmission, the primary connectivity component may be used. The primary connectivity component may communicate with a counterpart connectivity component to implement multipath transmission between the robot and the robot controller. In one example, the primary connectivity component may be associated with the robot controller and the counterpart connectivity component may be associated with the robot. This may mean that the primary connectivity component forms part of the robot controller itself or that the primary connectivity component is a component separate from the robot controller, e.g., a component residing in the communication path between the robot and the robot controller through which the robot controller communicates with the robot. Similarly, the counterpart connectivity component may form part of the robot itself or may be a component separate from the robot, e.g., a component residing in the communication path between the robot and the robot controller through which the robot communicates with the robot controller.

In order to decide on which of the available wireless transmission paths is to be used for communication between the robot and the robot controller, the primary connectivity component may trigger determining a robot sensitivity value and configure use of respective ones of the available wireless transmission paths depending on the determined robot sensitivity value. The robot sensitivity value may indicate a degree of operation sensitivity of the robot to a transmission failure between the robot and the robot controller. In other words, the robot sensitivity value may indicate how sensitive a current operation of the robot is with regard to a transmission deficiency between the robot and the robot controller, taking into account that such deficiency may negatively affect the operation of the robot currently being performed (e.g., preventing a desired operation of the robot from being performed in correct and/or precise manner).

The robot sensitivity value may be determined based on at least one of a degree of sensitivity of a current state of the robot, and a degree of criticality of a command to be executed by the robot. A high robot sensitivity value may mean that the robot is currently in a critical or sensitive state (e.g., the robot is moving swiftly) so that high transmission quality is crucial to maintain high quality of robot control. On the other hand, a low robot sensitivity value may mean that the robot is currently in an uncritical or insensitive state (e.g., the robot is standing still) in which high transmission quality is not as important. Similarly, when the robot sensitivity value is determined based on a degree of criticality of a command to be executed by the robot, a high robot sensitivity value may mean that safe receipt of the command is crucial to maintain correct operation of the robot, and a low robot sensitivity value may mean that safe receipt of the command is less important.

In some implementations, the degree of sensitivity of the current state of the robot may be determined based on at least one of a current speed of a Tool Center Point (TCP) of the robot, a current distance of the robot to a target pose (or position), and a criticality of a trajectory segment through which the robot currently moves. These use cases may be based on the assumption that fast movement or closeness to a target pose (or position) may correspond to a sensitive phase in respect of robot control quality. The degree of criticality of the command to be executed by the robot may be determined based on at least one of a type of the command, a history of commands executed by the robot, and the degree of sensitivity of the current state of the robot. A critical command may be a stop command, for example, and the history of commands may correspond to a series of speed commands that slow down the movement of the robot quickly. Further, when the degree of sensitivity of the current state of the robot is high, all movement commands may be determined to be critical commands, for example. Further, it is conceivable that the robot controller itself marks a command as being critical and indicates this criticality to the primary connectivity component.

Depending on the determined robot sensitivity value, the primary connectivity component may decide on which of the plurality of wireless transmission paths is to be used for communication between the robot and the robot controller. Thus, one or more of the available wireless transmission paths may be selected and corresponding use of these transmission paths may be configured. The selection may be made so that, depending on the determined robot sensitivity value, reliable communication and, thus, correct operation of the robot may be ensured.

In particular, when the determined robot sensitivity value exceeds a predetermined threshold, configuring use of the one or more of the plurality of wireless transmission paths for communication may comprise one of configuring use of two or more wireless transmission paths for simultaneous transmission between the robot and the robot controller, and configuring use of an alternative wireless transmission path among the plurality of wireless transmission paths for communication between the robot and the robot controller, wherein the alternative wireless transmission path is determined to be more reliable than a currently used wireless transmission path. Whether simultaneous use of two or more transmission paths or a reselection of a transmission path is desired may be decided based on the robot sensitivity value. The decision may be made to minimize the use of secondary transmission paths, for example. In this case, secondary transmission paths may be used only when needed to avoid robot control quality degradation. In another example, if a current primary transmission path is determined to be unable to provide the desired transmission quality and/or if the use of secondary transmission paths is getting too frequent and another transmission path appears to be more stable, then this transmission path may be chosen as the new primary path. For critical commands, it may be decided to always send these commands simultaneously on two or more available transmission paths in order to avoid loss or delay of commands that may potentially result in control degradation.

Configuring use of the one or more of the plurality of wireless transmission paths for communication between the robot and the robot controller may comprise one or more actions necessary to implement a corresponding change in the use of transmission paths. For example, configuring use of the one or more of the plurality of wireless transmission paths for communication may comprise at least one of activating one or more wireless interfaces corresponding to the one or more of the plurality of wireless transmission paths to be used for communication, and deactivating one or more wireless interfaces corresponding to the remaining ones of the plurality of wireless transmission paths. The wireless interfaces may be network interfaces available at the computing unit on which the primary connectivity component is executed. The network interfaces may include a mobile communication network interface, such as an LTE or 5G interface, and a WLAN interface, for example. Therefore, depending on the wireless transmission paths that have been selected for further use, the corresponding interfaces may be activated (if not yet active) and those interfaces which are no longer required can be deactivated in order to minimize the use of secondary paths.

Also, in order to enable the counterpart connectivity component to configure itself for the corresponding change in the use of transmission paths (e.g., to wake up corresponding network interfaces at the counterpart connectivity component's end), configuring use of the one or more of the plurality of wireless transmission paths for communication may comprise sending a configuration message to the counterpart connectivity component indicating which of the one or more of the plurality of wireless transmission paths are to be used for communication between the robot and the robot controller. For safe transmission of the configuration message, the configuration message may be sent over the one or more of the plurality of wireless transmission paths to be used for communication between the robot and the robot controller, i.e., those transmission paths that have been selected for further use due to their potential superior quality. Keep-alive messages may be sent to the counterpart connectivity component in the following and, if the robot sensitivity value falls below a certain threshold, sending the keep-alive messages may be stopped and interfaces no longer required may be deactivated, as described above.

Configuring use of the one or more of the plurality of wireless transmission paths for communication may be triggered when a delay or loss of a message is detected. In one variant, the connectivity requirement may be evaluated at receipt of a new status message and/or before transmission of a new command message. In a particular variant, the connectivity requirement may be evaluated at each receipt of a new status message and/or before each transmission of a new command message. The delay or loss of the message may be detected based on verifying the message on compliance with a predetermined communication scheme specific to the robot (e.g., in compliance with the 125 Hz requirement for periodically sending messages in case of a UR5 robot arm, as mentioned above). In one implementation, the delay or loss of the message may be detected when the message is not received by a time which corresponds to the sum of an expected reception time of the message according to the predetermined communication scheme and a delay threshold value. The delay threshold value, in turn, may be determined based on the robot sensitivity value.

Additionally or alternatively, configuring use of the one or more of the plurality of wireless transmission paths for communication may be triggered when a notification message indicating at least one of a relative delay between one or more of the plurality of wireless transmission paths, jitter on one or more of the plurality of wireless transmission paths and a loss of a message is received from the counterpart connectivity component. In case of a loss of a message, a retransmission request may be sent to the counterpart connectivity component, optionally together with the configuration message mentioned above.

Regarding the implementation on a transmission protocol level, a tunnel may be established between the primary connectivity component and the counterpart connectivity component, wherein communication between the robot and the robot controller may be carried out through the tunnel. The robot and the robot controller may then communicate based on an industrial transmission protocol, such as Profinet, for example, which is carried through the tunnel. The tunnel may be a VPN tunnel, for example.

Alternatively or additionally, when the primary connectivity component and the counterpart connectivity component are components separate from the robot and the robot controller (i.e., when communication between the robot and the robot controller is carried out via the primary connectivity component and the counterpart connectivity component), the primary connectivity component and the counterpart connectivity component may respectively communicate with the robot and the robot controller using a first transmission protocol (e.g., an industrial transmission protocol, such as Profinet), wherein communication between the primary connectivity component and the counterpart connectivity component may be carried out using a second transmission protocol. In this case, the industrial transmission protocol may be terminated locally at the primary and counterpart connectivity components, which may then communicate with each other using a second (different) transmission protocol (e.g., Ethernet). Also, different transmission protocols may be used for different transmission paths among the plurality of wireless transmission paths.

According to a second aspect, a method for providing reliable wireless communication between a robot and a robot controller in a cloud robotics system is provided. The method is performed by a counterpart connectivity component supporting multipath transmission over a plurality of wireless transmission paths to establish connectivity between the robot and the robot controller. The method comprises receiving a configuration message indicating that one or more particular wireless transmission paths of the plurality of wireless transmission paths are to be used for communication between the robot and the robot controller, and triggering configuring use of the one or more particular wireless transmission paths for communication between the robot and the robot controller.

The method according to the second aspect defines a method from a counterpart connectivity component's perspective which may be complementary to the method according to the first aspect performed by a primary connectivity component. In particular, the configuration message may be received from the primary connectivity component described above in relation to the first aspect. As such, those aspects described with regard to the method of the first aspect which are applicable to the method of the second aspect may be comprised by the method of the second aspect as well, and vice versa. Unnecessary repetitions are thus omitted in the following.

Similar to the method of the first aspect, to implement a change in the transmission paths, configuring use of the one or more particular wireless transmission paths for communication may comprise at least one of activating one or more wireless interfaces corresponding to the one or more particular wireless transmission paths to be used for communication, and deactivating one or more wireless interfaces corresponding to the remaining ones of the plurality of wireless transmission paths. The wireless interfaces may be network interfaces available at the computing unit on which the counterpart connectivity component is executed. The network interfaces may include a mobile communication network interface, such as an LTE or 5G interface, and a WLAN interface, for example. Depending on the wireless transmission paths that are to be configured for further use, the corresponding interfaces may be activated (if not yet active) and those interfaces which are no longer required can be deactivated in order to minimize the use of secondary paths. The configuration message may be received over the one or more particular wireless transmission paths to be used for communication between the robot and the robot controller, i.e., those wireless transmission paths that are to be configured for further use due to their potential superior quality.

The method performed by the counterpart connectivity component may also comprise triggering determining at least one of a relative delay between one or more of the plurality of wireless transmission paths, jitter on one or more of the plurality of wireless transmission paths and a loss of a message, and sending a notification message to the primary connectivity component indicating at least one of the determined relative delay between one or more of the plurality of wireless transmission paths, the determined jitter on one or more of the plurality of wireless transmission paths and the determined loss of a message. The notification message may be sent as a separate message or may be a status message to which such information is appended. The delay difference, jitter and loss may be determined based on sequence numbers and timestamps included in received messages (e.g., in commands received from the robot controller).

As in the method of the first aspect, a tunnel may be established between the counterpart connectivity component and the primary connectivity component, wherein communication between the robot and the robot controller may be carried out through the tunnel. Alternatively or additionally, when the primary connectivity component and the counterpart connectivity component are components separate from the robot and the robot controller (i.e., when communication between the robot and the robot controller is carried out via the primary connectivity component and the counterpart connectivity component), the counterpart connectivity component and the primary connectivity component may respectively communicate with the robot and the robot controller using a first transmission protocol, wherein communication between the counterpart connectivity component and the primary connectivity component may be carried out using a second transmission protocol.

In the above description of the first aspect and the second aspect, it has been assumed that the primary connectivity component may be associated with the robot controller and the counterpart connectivity component may be associated with the robot. It will be understood, however, that it is also conceivable that the primary connectivity component is associated with the robot and the counterpart connectivity component is associated with the robot controller. It is thus generally conceivable that a change in the transmission paths is initiated on both ends, i.e., either on the robot controller side or on the robot side.

According to a third aspect, a computer program product is provided. The computer program product comprises program code portions for performing the method of at least one of the first and the second aspect when the computer program product is executed on one or more computing devices (e.g., a processor or a distributed set of processors). The computer program product may be stored on a computer readable recording medium, such as a semiconductor memory, DVD, CD-ROM, and so on.

According to a fourth aspect, a computing unit for providing reliable wireless communication between a robot and a robot controller in a cloud robotics system is provided. The computing unit is configured to execute a primary connectivity component supporting multipath transmission over a plurality of wireless transmission paths to establish connectivity between the robot and the robot controller. The computing unit comprises at least one processor and at least one memory, the at least one memory containing instructions executable by the at least one processor such that the primary connectivity component is operable to trigger determining a robot sensitivity value indicating a degree of operation sensitivity of the robot to a transmission failure between the robot and the robot controller, and trigger configuring use of one or more of the plurality of wireless transmission paths for communication between the robot and the robot controller depending on the determined robot sensitivity value.

According to a fifth aspect, a computing unit for providing reliable wireless communication between a robot and a robot controller in a cloud robotics system is provided. The computing unit is configured to execute a counterpart connectivity component supporting multipath transmission over a plurality of wireless transmission paths to establish connectivity between the robot and the robot controller. The computing unit comprises at least one processor and at least one memory, the at least one memory containing instructions executable by the at least one processor such that the counterpart connectivity component is operable to receive a configuration message indicating that one or more of the plurality of wireless transmission paths are to be used for communication between the robot and the robot controller, and trigger configuring use of the one or more of the plurality of wireless transmission paths for communication between the robot and the robot controller.

The computing units according to the fourth aspect and the fifth aspect may be configured to perform any of the corresponding methods and method steps presented herein.

According to a sixth aspect, there is provided a system comprising a computing unit of the fourth aspect and a computing unit of the fifth aspect.

BRIEF DESCRIPTION OF THE DRAWINGS

Embodiments of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
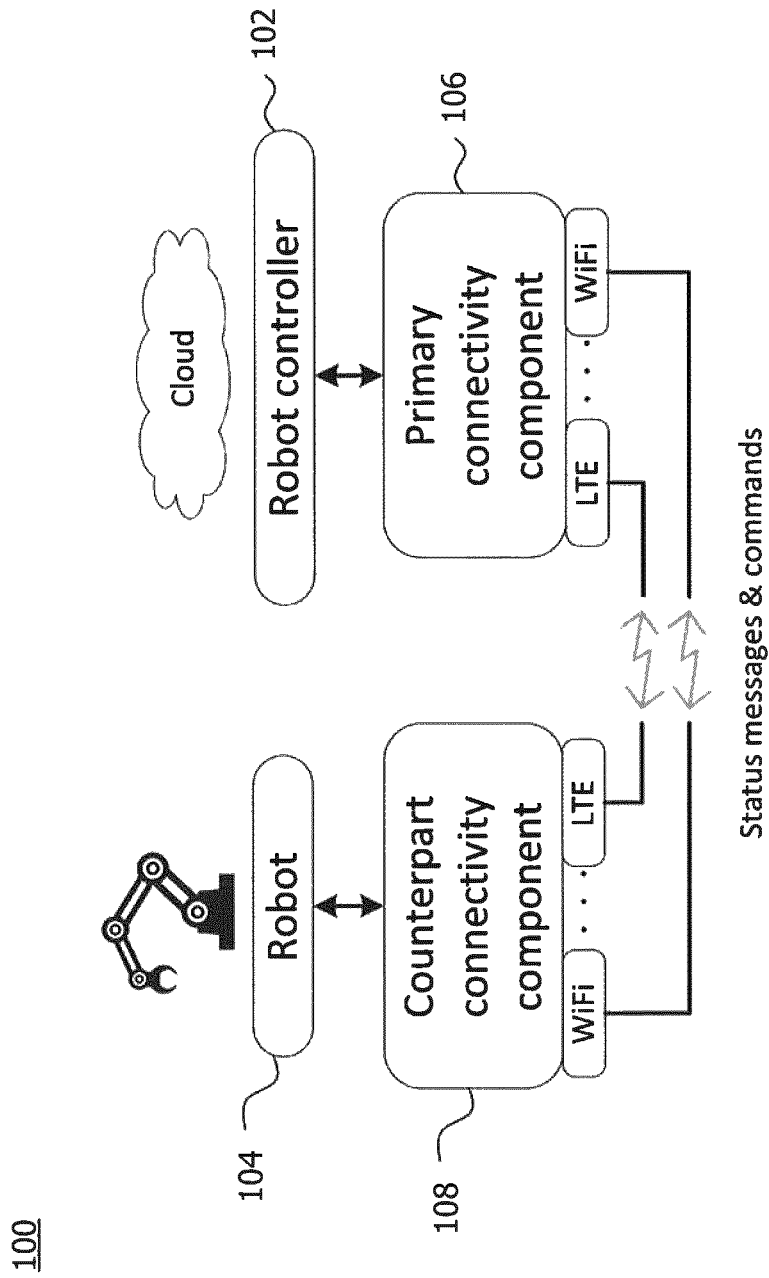
FIG. 1 schematically illustrates a cloud robotics system in which a robot controller may exchange status messages and commands with a robot using multipath transmission via a primary connectivity component and a counterpart connectivity component.

FIG. 1 schematically illustrates a cloud robotics system 100 which comprises a robot controller 102 executed in a cloud (i.e., more specifically in a cloud computing environment) and a robot 104 which may be a fixed or mobile robot (e.g., located in a plant or in an outdoor area) that wirelessly communicates with the robot controller 102 to exchange messages required for control of the robot 104. For example, the robot 104 may (e.g., periodically) send status messages to the robot controller 102, wherein a status message may contain information about the current physical state of the robot 104, such as joint positions, velocities, forces, currents, or the like. Status messages may enable the robot controller 102 to decide on a next action to be performed by the robot 104 and the robot controller 102 may send a corresponding command to the robot 104 to implement such action accordingly.

The robot 104 and the robot controller 102 communicate with each other via a primary connectivity component 106 and a counterpart connectivity component 108. In the example of FIG. 1, the primary connectivity component 106 is associated with the robot controller 102 and the counterpart connectivity component 108 is associated with the robot 104. The primary connectivity component 106 is a component separate from the robot controller 102, i.e., a component residing in the communication path between the robot 104 and the robot controller 102 through which the robot controller 102 communicates with the robot 104. Similarly, the counterpart connectivity component 108 is a component separate from the robot 104, i.e., a component residing in the communication path between the robot 104 and the robot controller 102 through which the robot 104 communicates with the robot controller 102. It will be understood that this configuration is merely exemplary and that it is also conceivable that the primary connectivity component 106 could form part of the robot controller 102 itself. Similarly, the counterpart connectivity component 108 could form part of the robot 104 itself.

The robot 104 and the robot controller 102 may use multipath transmission over a plurality of wireless transmission paths to provide reliable communication among each other. The primary connectivity component 106 and the counterpart connectivity component 108 support multipath transmission over the plurality of wireless transmission paths accordingly. As known in the art, multipath transmission allows adaptive concurrent or interchangeable use of multiple paths (e.g., network links) to improve resource usage and increase redundancy for a network connection. For example, multipath transmission may enable simultaneous use of a plurality of transmission paths or enable switching from a currently used transmission path to an alternative transmission path that provides better reliability or bandwidth. Concurrently or interchangeably usable network interfaces associated with these transmission paths may include a mobile communication network interface, such as an LTE or 5G interface and a WLAN interface (denoted by "WiFi" in FIG. 1), for example.

Figure 2:
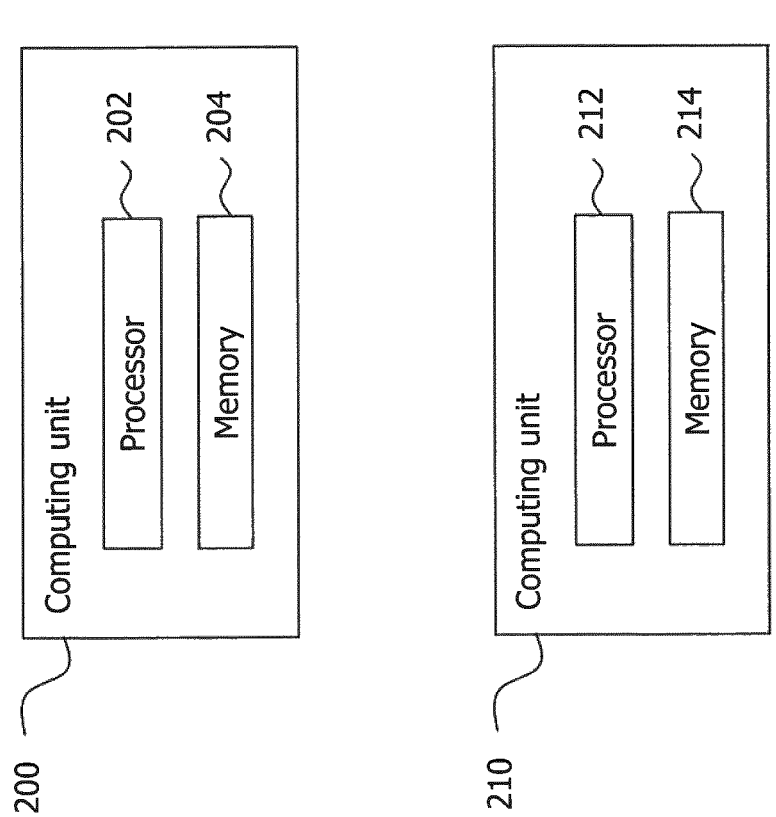
FIGS. 2a and 2b illustrate exemplary compositions of computing units configured to execute the primary connectivity component and the counterpart connectivity component of FIG. 1.

FIG. 2a schematically illustrates an exemplary composition of a computing unit 200 which is configured to execute the primary connectivity component 106. The computing unit 200 comprises at least one processor 202 and at least one memory 204, wherein the at least one memory 204 contains instructions executable by the at least one processor 202 such that the computing unit 200 is operable to carry out the method steps described herein with reference to the primary connectivity component 106.

Similar to the robot controller 102, the computing unit 200 may reside in the cloud. It will thus be understood that the computing unit 200 may be both a physical computing unit as well as a virtualized computing unit, such as a virtual machine, for example. It will further be appreciated that the computing unit 200 may not necessarily be implemented as a standalone computing unit, but may be implemented as a component—realized in software and/or hardware—residing on multiple distributed computing units.

FIG. 2b schematically illustrates an exemplary composition of a computing unit 210 which is configured to execute the counterpart connectivity component 108. The computing unit 210 comprises at least one processor 212 and at least one memory 214, wherein the at least one memory 214 contains instructions executable by the at least one processor 212 such that the computing unit 210 is operable to carry out the method steps described herein with reference to the counterpart connectivity component 108.

Figure 3:
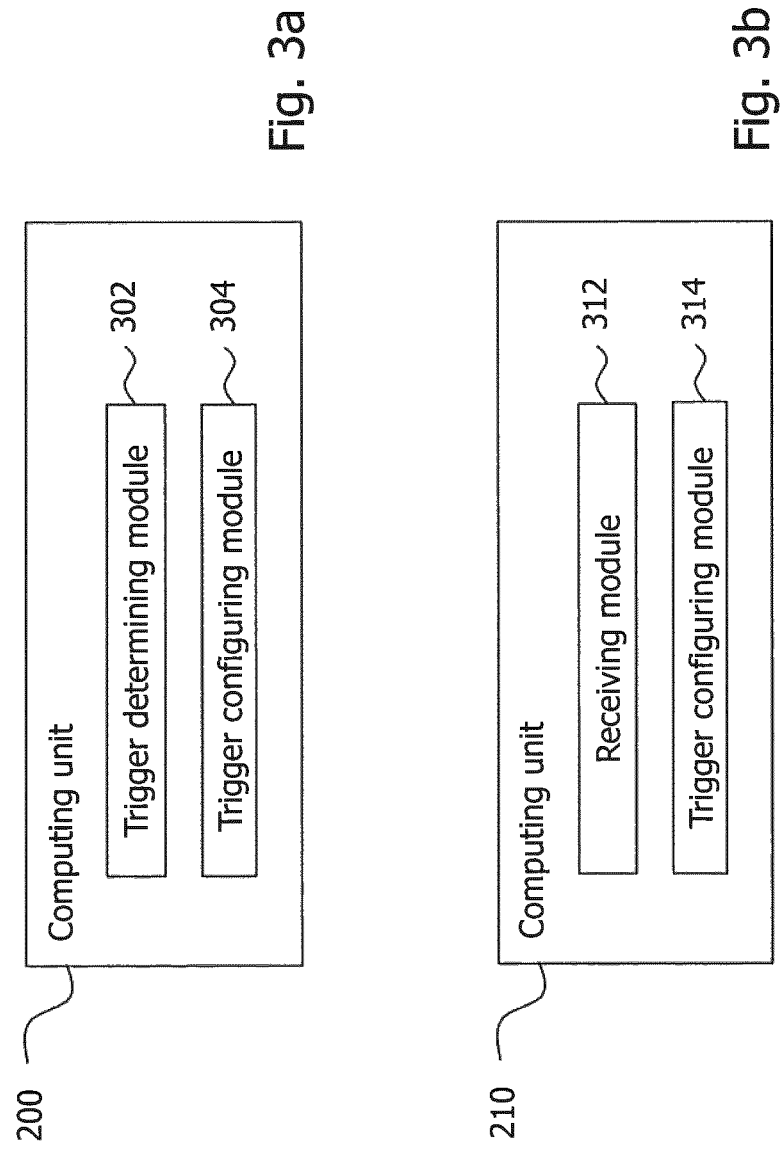
FIGS. 3a and 3b illustrate modular compositions of computing units configured to execute the primary connectivity component and the counterpart connectivity component of FIG. 1.

FIG. 3a schematically illustrates a modular composition of the computing unit 200. The computing unit 200 comprises a trigger determining module 302 and a trigger configuring module 304. Similarly, FIG. 3b schematically illustrates a modular composition of the computing unit 210. The computing unit 210 comprises a receiving module 312 and a trigger configuring module 314. The basic operation of the modules 302, 304, 312 and 314 will be described in the following with reference to FIG. 4.

Figure 4:
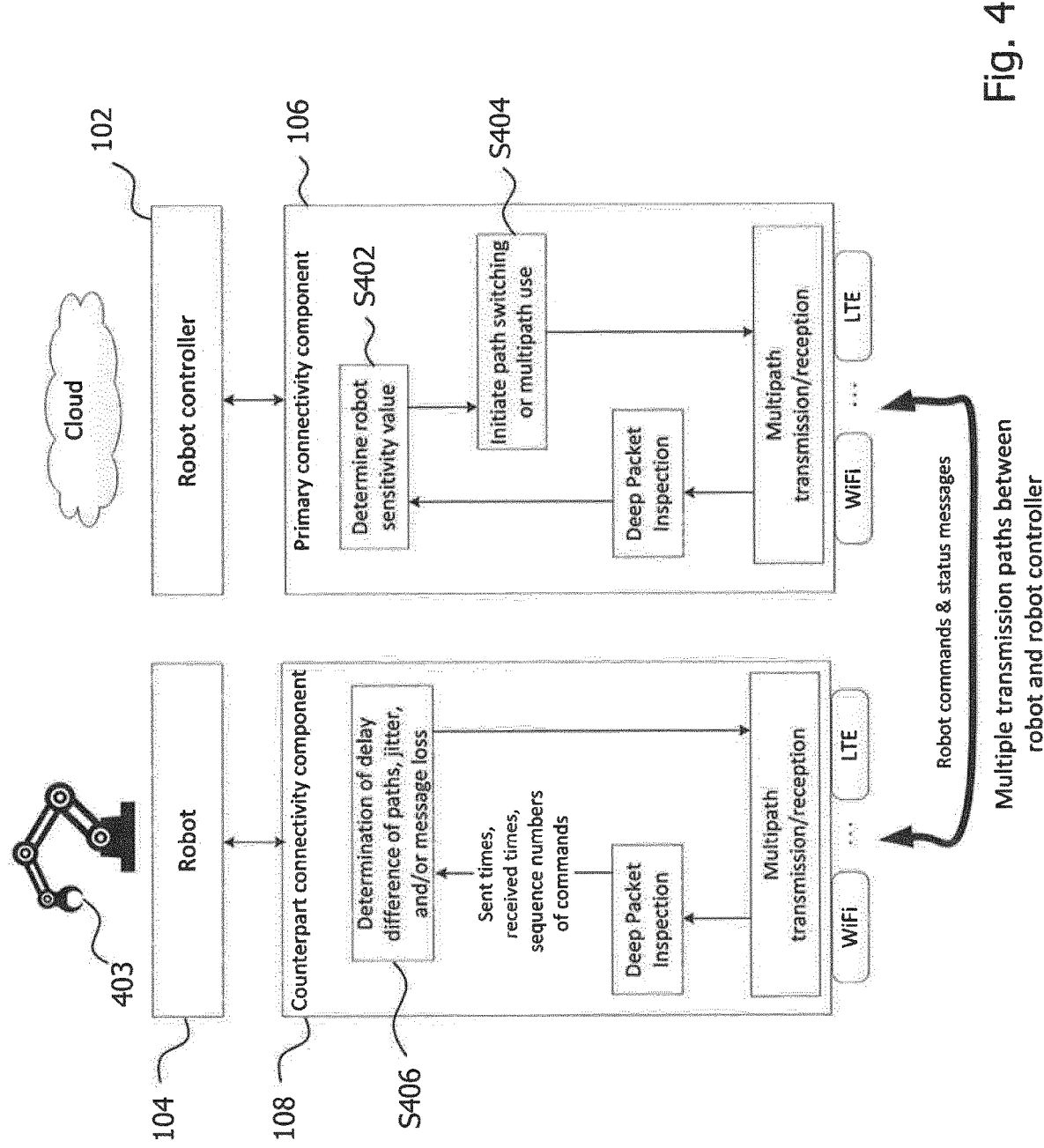
FIG. 4 illustrates a method embodiment which may be performed by the primary connectivity component and the counterpart connectivity component of FIG. 1.

FIG. 4 illustrates a method embodiment which may be performed in the cloud robotics system 100. In order to decide on which of the available transmission paths is to be used for communication between the robot 104 and the robot controller 102, the primary connectivity component 106 may trigger determining a robot sensitivity value and configure use of respective ones of the available wireless transmission paths depending on the determined robot sensitivity value. Thus, in step S402, the trigger determining module 302 of the computing unit 200 may trigger determining a robot sensitivity value. The robot sensitivity value may indicate a degree of operation sensitivity of the robot 104 to a transmission failure between the robot 104 and the robot controller 102. In other words, the robot sensitivity value may indicate how sensitive a current operation of the robot 104 is with regard to a transmission deficiency between the robot 104 and the robot controller 102, taking into account that such deficiency may negatively affect an operation of the robot 104 currently being performed (e.g., preventing a desired operation of the robot 104 from being performed in a correct and/or precise manner).

The robot sensitivity value may be determined based on at least one of a degree of sensitivity of a current state of the robot 104, and a degree of criticality of a command to be executed by the robot 104. A high robot sensitivity value may mean that the robot 104 is currently in a critical or sensitive state (e.g., the robot 104 is moving swiftly) so that high transmission quality is crucial to maintain high quality of robot control. On the other hand, a low robot sensitivity value may mean that the robot 104 is currently in an uncritical or insensitive state (e.g., the robot 104 is standing still) in which high transmission quality is not as important. Similarly, when the robot sensitivity value is determined based on a degree of criticality of a command to be executed by the robot 104, a high robot sensitivity value may mean that safe receipt of the command is crucial to maintain correct operation of the robot 104, and a low robot sensitivity value may mean that safe receipt of the command is less important.

In some implementations, the degree of sensitivity of the current state of the robot 104 may be determined based on at least one of a current speed of a Tool Center Point (TCP) of the robot 104 (indicated by reference numeral 403 in FIG. 4), a current distance of the robot 104 to a target pose (or position), and a criticality of a trajectory segment through which the robot 104 currently moves. These use cases may be based on the assumption that fast movement or closeness to a target pose (or position) may correspond to a sensitive phase in respect of robot control quality. The degree of criticality of the command to be executed by the robot 104 may be determined based on at least one of a type of the command, a history of commands executed by the robot 104, and the degree of sensitivity of the current state of the robot 104. A critical command may be a stop command, for example, and the history of commands may correspond to a series of speed commands that slow down the movement of the robot 104 quickly. When the degree of sensitivity of the current state of the robot 104 is high, all movement commands may be determined to be critical commands, for example. Further, it is conceivable that the robot controller 102 itself marks a command as being critical and indicates this criticality to the primary connectivity component 106.

Depending on the determined robot sensitivity value, the primary connectivity component 106 may decide on which of the plurality of wireless transmission paths is to be used for communication between the robot 104 and the robot controller 102. Thus, one or more of the available wireless transmission paths may be selected and corresponding use of these transmission paths may be configured. The selection may be made so that, depending on the determined robot sensitivity value, reliable communication and, hence, correct operation of the robot 104 may be ensured. Thus, in step S404, the trigger configuring module 304 of the computing unit 200 may trigger configuring use of the one or more of the plurality of wireless transmission paths for communication between the robot 104 and the robot controller 102 depending on the determined robot sensitivity value.

When the determined robot sensitivity value exceeds a predetermined threshold, configuring use of the one or more of the plurality of wireless transmission paths for communication may comprise configuring use of two or more wireless transmission paths for simultaneous transmission between the robot 104 and the robot controller 102 or, alternatively, configuring use of an alternative wireless transmission path among the plurality of wireless transmission paths for communication between the robot 104 and the robot controller 102, wherein the alternative wireless transmission path is determined to be more reliable than a currently used wireless transmission path. Whether simultaneous use of two or more transmission paths or a reselection of a transmission path is desired may be decided based on the robot sensitivity value. The decision may be made so as to minimize the use of secondary transmission paths, for example. In this case, secondary transmission paths may be used only when needed to avoid robot control quality degradation. In another example, if a current primary transmission path is determined to be unable to provide the desired transmission quality and/or if the use of secondary transmission paths is getting too frequent and another transmission path appears to be more stable, then this transmission path may be chosen as the new primary path. For critical commands, it may be decided to always send these commands simultaneously on two or more available transmission paths in order to avoid loss or delay of commands that may potentially result in control degradation.

In order to configure use of the one or more of the plurality of wireless transmission paths for communication between the robot 104 and the robot controller 102, one or more actions necessary to implement a corresponding change in the use of transmission paths may be performed. For example, configuring use of the one or more of the plurality of wireless transmission paths for communication may comprise at least one of activating one or more wireless interfaces corresponding to the one or more of the plurality of wireless transmission paths to be used for communication, and deactivating one or more wireless interfaces corresponding to the remaining ones of the plurality of wireless transmission paths. The wireless interfaces may be network interfaces available at the computing unit 200, i.e., the computing unit on which the primary connectivity component 106 is executed. The network interfaces may include a mobile communication network interface, such as an LTE or 5G interface, and a WLAN interface (denoted by "WiFi" in FIG. 4), for example. Depending on the wireless transmission paths that have been selected for further use, the corresponding interfaces may be activated (if not yet active) and those interfaces which are no longer required can be deactivated in order to minimize the use of secondary paths.

Also, in order to enable the counterpart connectivity component 108 to configure itself for the change in the use of transmission paths (e.g., to wake up corresponding network interfaces at the counterpart connectivity component's end), configuring use of the one or more of the plurality of wireless transmission paths for communication may comprise sending, by the primary connectivity component 106, a configuration message to the counterpart connectivity component 108 indicating which of the one or more of the plurality of wireless transmission paths are to be used for communication between the robot 104 and the robot controller 102. The counterpart connectivity component 108, more specifically, the receiving module 312 of the computing unit 210, may receive the configuration message accordingly and the trigger configuring module 314 of the computing unit 210 may trigger configuring use of the one or more of the plurality of wireless transmission paths for communication at the counterpart connectivity component's end. Similar to the primary connectivity component's end, this may comprise at least one of activating one or more wireless interfaces corresponding to the one or more wireless transmission paths to be used for communication, and deactivating one or more wireless interfaces corresponding to the remaining ones of the plurality of wireless transmission paths. These wireless interfaces may be network interfaces available at the computing unit 210, wherein the wireless interfaces may correspond to those available at the computing unit 200. These network interfaces may thus include a mobile communication network interface, such as an LTE or 5G interface, and a WLAN interface, for example. Depending on the wireless transmission paths that are to be configured for further use, the corresponding interfaces may be activated (if not yet active) and those interfaces which are no longer required can be deactivated in order to minimize the use of secondary paths.

For safe transmission of the configuration message from the primary connectivity component 106 to the counterpart connectivity component 108, the configuration message may be sent over the one or more of the plurality of wireless transmission paths to be used for communication between the robot 104 and the robot controller 102, i.e., those transmission paths that have been selected for further use due to their potential superior quality. Keep-alive messages may be sent from the primary connectivity component 106 to the counterpart connectivity component 108 in the following and, if the robot sensitivity value falls below a certain threshold, sending the keep-alive messages may be stopped and interfaces no longer required may be deactivated, as described above.

At the primary connectivity component's end, configuring use of the one or more of the plurality of wireless transmission paths for communication may be triggered when a delay or loss of a message is detected. In one variant, the connectivity requirement may be evaluated at receipt of a new status message and/or before transmission of a new command message. In a particular variant, the connectivity requirement may be evaluated at each receipt of a new status message and/or before each transmission of a new command message. In FIG. 4, it is indicated that, for a message received at the primary connectivity component 106 (e.g., originated at the robot 104 and directed to the robot controller 102), deep packet inspection (DPI) or similar techniques may be used to identify details of the received message, such as sent times, sequence numbers in case of status messages, for example, which may then be used to determine whether a message is delayed or a message has been lost. The actual message received by the primary connectivity component 106 may then be forwarded to the robot controller 102 so that the message can be processed by the robot controller 102 accordingly. Messages received at the primary connectivity component 106 from the robot controller 102 (e.g., commands), in turn, may be forwarded by the primary connectivity component 106 to the counterpart connectivity component 108 for further delivery to the robot 104. Timing information (e.g., sent times) and/or sequence numbers may be appended to these messages so that the counterpart connectivity component 108 may detect delay or loss of messages in a similar manner.

The delay or loss of a message received at the primary connectivity component 106 may be detected based on verifying the message on compliance with a predetermined communication scheme specific to the robot 104 (e.g., in compliance with the 125 Hz requirement for periodically sending messages in case of a UR5 robot arm, as mentioned above). In one particular implementation, the delay or loss of the message may be detected when the message is not received by a time which corresponds to the sum of an expected reception time of the message according to the predetermined communication scheme and a delay threshold value. The delay threshold value, in turn, may be determined based on the robot sensitivity value.

Configuring use of the one or more of the plurality of wireless transmission paths for communication at the primary connectivity component's end may also be triggered when a notification message is received from the counterpart connectivity component 108, wherein the notification message indicates at least one of a relative delay between one or more of the plurality of wireless transmission paths, jitter on one or more of the plurality of wireless transmission paths and a loss of a message. Based on such feedback, the primary connectivity component 106 may adapt faster to new connectivity requirements. In case of a loss of a message, a retransmission request may be sent by the primary connectivity component 106 to the counterpart connectivity component 108, optionally together with the configuration message mentioned above.

In FIG. 4, it is indicated that, for a message received at the counterpart connectivity component 108 (e.g., originated at the robot controller 102 and directed to the robot 104), deep packet inspection (DPI) or similar techniques may be used to identify details of the received message, such as sent times, sequence numbers in case of a command, for example, which may then be used by the counterpart connectivity component 108 to determine, in step S406, the delay difference of the wireless transmission paths, the jitter on the wireless transmission paths and/or the message loss. This information may then be notified to the primary connectivity component 106, as mentioned above. The actual message received at the counterpart connectivity component 108 may be forwarded to the robot 104 so that the message can be processed by the robot 104. Messages received at the counterpart connectivity component 108 from the robot 104 (e.g., status messages), in turn, may be forwarded by the counterpart connectivity component 108 to the primary connectivity component 106 for further delivery to the robot controller 102. Timing information (e.g., sent times) and/or sequence numbers may be appended to such messages so that the primary connectivity component 106 may detect delay or loss of messages, as described above.

Regarding the implementation on a transmission protocol level, a tunnel may be established between the primary connectivity component 106 and the counterpart connectivity component 108, wherein communication between the robot 104 and the robot controller 102 may be carried out through the tunnel. The robot 104 and the robot controller 102 may then communicate based on an industrial transmission protocol, such as Profinet, for example, which is carried through the tunnel. The tunnel may be a VPN tunnel, for example.

Alternatively or additionally, the primary connectivity component 106 and the counterpart connectivity component 108 may respectively communicate with the robot 104 and the robot controller 102 using a first transmission protocol (e.g., an industrial transmission protocol, such as Profinet, for example), wherein communication between the primary connectivity component 106 and the counterpart connectivity component 108 may be carried out using a second transmission protocol. In this case, the industrial transmission protocol may be terminated locally at the connectivity components 106 and 108, which may then communicate with each other using a second (different) transmission protocol (e.g., Ethernet). Also, different transmission protocols may be used for different transmission paths among the plurality of wireless transmission paths.

As has become apparent from the above, the present disclosure presents a technique for providing reliable wireless communication between a robot and a robot controller in a cloud robotics system. The technique may provide a proactive multipath solution to increase reliability for robot communication and, more specifically, a proactive robot controller-aware connectivity management solution in which the robot and the robot controller as well as the corresponding communication characteristics may be taken into account to online evaluate connection quality. Immediate action may then be executed to instantly improve reliability as needed. Reliability may be improved by utilizing characteristics of a robot control specific communication scheme and by monitoring connectivity requirements regarding robot control, for example. The primary and counterpart connectivity components may proactively handle connectivity problems to avoid status/command message delay or loss. Also, too frequent changes among transmission paths may be avoided and radio interfaces may go down to sleep mode if they are not required.

All in all, using the presented technique, it may be possible to proactively handle connectivity problems that can degrade robot control quality and to thereby improve robot control quality. At the same time, available radio resources may be used in an efficient manner. Also, communication between the robot and the robot controller may not rely on transmission protocols like TCP/IP but may allow the use of industrial transmission protocols for wireless connections between the robot and the robot controller. Spectrum efficient multipath access may thus be achieved.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for providing reliable wireless communication between a robot and a robot controller in a cloud robotics system, the method being performed by a primary connectivity component supporting multipath transmission over a plurality of wireless transmission paths to establish connectivity between the robot and the robot controller, the method comprising:
   triggering determining a robot sensitivity value indicating a degree of operation sensitivity of the robot to a transmission failure between the robot and the robot controller; and
   triggering configuring use of one or more of the plurality of wireless transmission paths for communication between the robot and the robot controller based on the determined robot sensitivity value.

2. The method of claim 1, wherein the robot sensitivity value is determined based on:
   a degree of sensitivity of a current state of the robot; and/or
   a degree of criticality of a command to be executed by the robot.

3. The method of claim 2, wherein the degree of sensitivity of the current state of the robot is determined based on:
   a current speed of a tool center point (TCP) of the robot;
   a current distance of the robot to a target pose; and/or
   a criticality of a trajectory segment through which the robot currently moves.

4. The method of claim 2, wherein the degree of criticality of the command to be executed by the robot is determined based on:
   a type of the command;
   a history of commands executed by the robot; and/or
   the degree of sensitivity of the current state of the robot.

5. The method of claim 1, wherein, when the determined robot sensitivity value exceeds a predetermined threshold, the configuring use of the one or more of the plurality of wireless transmission paths for communication comprises one of:
   configuring use of two or more wireless transmission paths for simultaneous transmission between the robot and the robot controller; and
   configuring use of an alternative wireless transmission path among the plurality of wireless transmission paths for communication between the robot and the robot controller, wherein the alternative wireless transmission path is determined to be more reliable than a currently used wireless transmission path.

6. The method of claim 1, wherein the configuring use of the one or more of the plurality of wireless transmission paths for communication comprises:
   activating one or more wireless interfaces corresponding to the one or more of the plurality of wireless transmission paths to be used for communication; and/or
   deactivating one or more wireless interfaces corresponding to the remaining ones of the plurality of wireless transmission paths.

7. The method of claim 1, wherein the configuring use of the one or more of the plurality of wireless transmission paths for communication comprises:
   sending a configuration message to a counterpart connectivity component indicating which of the one or more of the plurality of wireless transmission paths are to be used for communication between the robot and the robot controller.

8. The method of claim 7, wherein the configuration message is sent over the one or more of the plurality of wireless transmission paths to be used for communication between the robot and the robot controller.

9. The method of claim 1, wherein the configuring use of the one or more of the plurality of wireless transmission paths for communication is triggered when a delay or loss of a message is detected.

10. The method of claim 9, wherein the delay or loss of the message is detected based on verifying the message is in compliance with a predetermined communication scheme specific to the robot.

11. The method of claim 1, wherein the configuring use of the one or more of the plurality of wireless transmission paths for communication is triggered when a notification message received from a counterpart connectivity component; the notification message indicating: a relative delay between one or more of the plurality of wireless transmission paths, jitter on one or more of the plurality of wireless transmission paths; and/or a loss of a message.

12. The method of claim 1:
   wherein a tunnel is established between the primary connectivity component and a counterpart connectivity component; and
   wherein communication between the robot and the robot controller is carried out through the tunnel.

13. The method of claim 1:
   wherein communication between the robot and the robot controller is carried out via the primary connectivity component and a counterpart connectivity component;
   wherein the primary connectivity component and the counterpart connectivity component respectively communicate with the robot and the robot controller using a first transmission protocol; and
   wherein communication between the primary connectivity component and the counterpart connectivity component is carried out using a second transmission protocol.

14. A computing unit for providing reliable wireless communication between a robot and a robot controller in a cloud robotics system, the computing unit configured to execute a primary connectivity component supporting multipath transmission over a plurality of wireless transmission paths to establish connectivity between the robot and the robot controller, the computing unit comprising:
   processing circuitry;

memory containing instructions executable by the processing circuitry whereby the computing unit is operative to:

trigger determining a robot sensitivity value indicating a degree of operation sensitivity of the robot to a transmission failure between the robot and the robot controller; and trigger configuring use of one or more of the plurality of wireless transmission paths for communication between the robot and the robot controller depending on the determined robot sensitivity value.

* * * * *